(12) United States Patent
Wang et al.

(10) Patent No.: US 11,436,808 B2
(45) Date of Patent: Sep. 6, 2022

(54) SELECTING AUGMENTED REALITY OBJECTS FOR DISPLAY BASED ON CONTEXTUAL CUES

(71) Applicant: GOOGLE LLC, Mountain View, CA (US)

(72) Inventors: Diane Wang, Mountain View, CA (US); Paulo Coelho, San Jose, CA (US); Tarik Hany Abdel-Gawad, San Francisco, CA (US); Matthew Gilgenbach, Mountain View, CA (US); Jackson Lango, Mountain View, CA (US); Douglas Muir, Encino, CA (US); Mark Dochtermann, Sherman Oaks, CA (US); Suddhasattwa Bose, Culver City, CA (US); Ashley Pinnick, Pasadena, CA (US); Drew Skillman, Sherman Oaks, CA (US); Samantha Raja, San Francisco, CA (US); Steven Toh, Alameda, CA (US); Brian Collins, San Francisco, CA (US); Jay Steele, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/283,774

(22) PCT Filed: Oct. 9, 2019

(86) PCT No.: PCT/US2019/055392
§ 371 (c)(1),
(2) Date: Apr. 8, 2021

(87) PCT Pub. No.: WO2020/076946
PCT Pub. Date: Apr. 16, 2020

(65) Prior Publication Data
US 2021/0383609 A1 Dec. 9, 2021

Related U.S. Application Data

(60) Provisional application No. 62/743,038, filed on Oct. 9, 2018.

(51) Int. Cl.
*G06T 19/00* (2011.01)
*G06F 3/0481* (2022.01)
(Continued)

(52) U.S. Cl.
CPC ........ *G06T 19/006* (2013.01); *G06F 3/04815* (2013.01); *G06T 7/11* (2017.01)

(58) Field of Classification Search
CPC .................................................. G06T 19/006
(Continued)

(56) References Cited

U.S. PATENT DOCUMENTS 8,872,853 B2 * 10/2014 Sugden ............... G06F 3/04815
345/633
9,345,957 B2 * 5/2016 Geisner ................. G06T 19/006
(Continued)

FOREIGN PATENT DOCUMENTS

WO    2017012662 A1    1/2017
WO    WO2017012662 A1 *  1/2017 ............. G06F 17/30

OTHER PUBLICATIONS

Communication pursuant to Rules 161(1) and 162 EPC dated May 19, 2021 for corresponding European Application No. 19794825.0, 3 pages.
(Continued)

*Primary Examiner* — Javid A Amini

(57) ABSTRACT

Disclosed are various embodiments for selecting augmenting reality (AR) objects based on contextual cues associated
(Continued)

with an image captured by a camera associated with electronic device. Contextual cues are obtained at an electronic device and AR objects are identified from a memory associated with the electronic device. The electronic device implements a processor employing image segmentation techniques to combine the identified AR objects with the captured image and render the combined image for display at a display associated with the electronic device.

20 Claims, 4 Drawing Sheets

(51) Int. Cl.
    *G06T 7/11*     (2017.01)
    *G06F 3/04815*     (2022.01)

(58) Field of Classification Search
    USPC .......................................................... 345/633
    See application file for complete search history.

(56) References Cited

U.S. PATENT DOCUMENTS

| | | | |
|---|---|---|---|
| 9,536,352 B2* | 1/2017 | Anderson | G06K 17/0016 |
| 10,445,933 B2* | 10/2019 | Rasane | G06T 19/003 |
| 10,573,183 B1* | 2/2020 | Li | G08G 1/005 |
| 2007/0008341 A1* | 1/2007 | Endo | G06T 7/11 |
| | | | 345/633 |
| 2012/0075342 A1* | 3/2012 | Choubassi | G06T 17/00 |
| | | | 345/633 |
| 2012/0262485 A1* | 10/2012 | Raghoebardajal | G06T 7/136 |
| | | | 345/633 |
| 2014/0076965 A1* | 3/2014 | Becorest | G06Q 20/342 |
| | | | 235/380 |
| 2015/0070389 A1* | 3/2015 | Goto | G06T 7/00 |
| | | | 345/633 |
| 2015/0279101 A1* | 10/2015 | Anderson | G09G 5/377 |
| | | | 345/633 |
| 2015/0279113 A1* | 10/2015 | Knorr | G06T 15/50 |
| | | | 345/633 |
| 2015/0319376 A1* | 11/2015 | Nemeckay | H04N 1/387 |
| | | | 345/633 |
| 2015/0356785 A1* | 12/2015 | Takemoto | G06K 9/00355 |
| | | | 345/633 |
| 2016/0180590 A1* | 6/2016 | Kamhi | G06K 9/00671 |
| | | | 345/633 |
| 2019/0205645 A1* | 7/2019 | Bates | G06T 11/60 |

OTHER PUBLICATIONS

International Search Report and Written Opinion dated Jan. 22, 2020 for corresponding International Application No. PCT/US2019/055392, 17 pages.

* cited by examiner

11,436,808 B2

SELECTING AUGMENTED REALITY OBJECTS FOR DISPLAY BASED ON CONTEXTUAL CUES

CROSS-REFERENCE TO RELATED APPLICATIONS

The present application is a U.S. National Stage under 35 U.S.C. § 371 of International Patent Application Serial No. PCT/US2019/055392, entitled "SELECTING AUGMENTED REALITY OBJECTS FOR DISPLAY BASED ON CONTEXTUAL CUES" and filed on 9 Oct. 2019, which claims priority to U.S. Provisional Application No. 62/743,038, entitled "SELECTING AUGMENTED REALITY OBJECTS FOR DISPLAY BASED ON CONTEXTUAL CUES" and filed on 9 Oct. 2018, the entireties of which are incorporated by reference herein.

BACKGROUND

Augmented and virtual reality applications have become increasingly sophisticated as processors and other computing modules have grown more capable. Virtual reality applications present, via a display device such as a head mounted display, a virtual environment to a user, and in some cases allow the user to interact with the virtual environment. Augmented reality applications, in contrast, merge virtual objects (referred to herein as "augmented reality objects") with images of the real environment of the user. Augmented reality applications therefore present the challenge of merging the augmented reality objects with the images of the real environment in a way that provides a satisfactory user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for selecting an augmented reality object for display in an image of a real environment based contextual cues in accordance with some embodiments. The electronic device includes a camera that captures images of the real environment and sensors, such as an inertial measurement unit (IMU) that captures a pose (position and orientation) of the electronic device. Based on contextual cues, such as an identified user expression, objects or figures identified from the captured images, received weather or other environmental information, time of day, sound information, and the like, the electronic device selects and modifies an augmented reality (AR) object from a memory. The electronic device composites the selected AR object with the captured image to generate a combined image for display. Further, as the contextual cues change, the electronic device can change the selected AR object to reflect the changing context, thereby improving the user experience.

Figure 1:
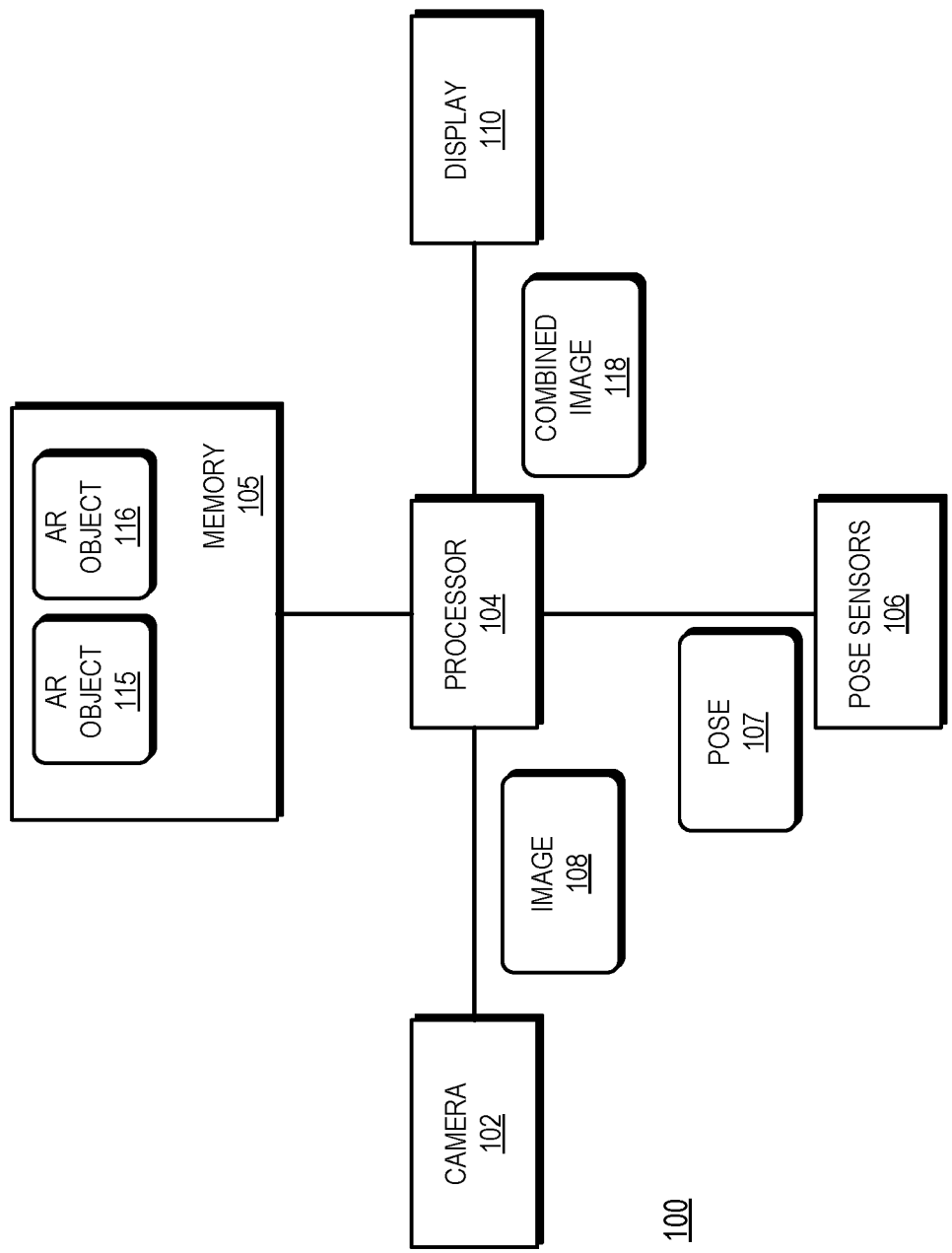
FIG. 1 is a block diagram of an electronic device that selects an augmented reality object in an image of a real environment based on contextual cues in accordance with some embodiments.

FIG. 1 illustrates a block diagram of an electronic device 100 that places an augmented reality object in an image of a real environment based on a pose of the electronic device 100 and based on image segmentation in accordance with some embodiments. In some embodiments, the electronic device 100 may comprise, for example, a server computer or other system providing computing capabilities. Alternatively, a plurality of electronic devices 100 may be employed that are arranged for example, in or more server banks or computer banks or arrangements. For example, a plurality of electronic devices 100 together may comprise a cloud computing resource, a grid computing resource, and/or any other distributed computer component. Such electronic devices 100 may be located in a single installation or may be distributed among many different geographical locations. For purposes of convenience, the electronic device 100 is referred to herein in the singular. Even though the electronic device 100 is referred to in the singular, it is understood that a plurality of electronic devices 100 may be employed in various arrangements as described above.

The electronic device 100 can be any device capable of generating or displaying AR content, including a desktop or laptop computer, a smartphone, a tablet, a gaming console, and the like. For purposes of describing the example embodiment of FIG. 1, it is assumed that the electronic device 100 is a smartphone.

To support display of AR content, the electronic device 100 includes a camera 102, a processor 104, a memory 105, and a display 110. The camera 102 is, in at least one embodiment, a digital camera including one or more image sensors that collectively capture images (e.g., image 108) of an environment of the electronic device 100. In some embodiments, the camera 102 is configured to automatically capture images of the environment without user actuation or intervention for each individual image. For example, as a user moves around the environment, the camera 102 periodically captures the images the environment at specified intervals. As described further herein, the images can be used by the electronic device 100 for one or more applications, such as determining a location of the electronic device 100, identifying objects in the environment of the electronic device 100, and the like.

The processor 104 is a general-purpose or application-specific processor generally configured to execute sets of instructions (e.g., applications) to carry out specified tasks for the electronic device 100 as described further herein. In various embodiments, the processor 104 is a processing device, such as a central processing unit (CPU), a graphics processing unit (GPU), a neutral network processor, or a combination thereof, configured to execute operations for the electronic device 100 as described further herein. It will be appreciated that although for clarity the processor 104 is illustrated as a single processor, in some embodiments, the processor 104 can represent multiple processing units, with each processing unit including one or more processor cores or compute units.

The display 110 is a display device (e.g., a display screen) generally configured to display images to a user of the electronic device 100. The display 110 may comprise, for example, one or more devices such as cathode ray tubes (CRTs), liquid crystal display (LCD) screens, gas plasma-based flat panel displays, LCD projectors, or other types of display devices. In some embodiments, the electronic device 100 includes a network interface (not shown) to connect the electronic device 100 to a network (e.g., the Internet) from which the electronic device 100 can receive weather information, time information, and the like. In addition, in some embodiments the electronic device 100 includes additional sensors (not shown) to capture information from the environment of the electronic device 100, such as one or more microphones to capture sounds in the environment of the electronic device 100.

The pose sensors 106 includes one or more sensors configured to collectively generate pose information, referred to as poses (e.g., pose 107) reflecting a position, orientation, or combination thereof, of the electronic device 100. In at least one embodiment, the pose sensors 106 include an inertial measurement unit (IMU). The pose sensors 106 can include other or additional pose sensors, such as a global positioning satellite (GPS) sensor. In at least one embodiment, the pose sensors 106 can also include a simultaneous localization and mapping (SLAM) module that generates a map of the environment of the electronic device 100 based on objects identified in images captured by the camera 102. The SLAM module identifies the objects according to conventional machine vision techniques and compares the objects to an object store (not shown) stored at the electronic device 100 or at a remote server that communicates with the electronic device 100 via a network (e.g. via the Internet). The location of the objects in the object store is known, such that the SLAM module can generate the environment map based on the object comparison. Thus, the poses generated by the pose sensors 106 can be based on a combination of sensors, such as a combination of IMU data and SLAM mapping information.

The memory 105 is computer memory, such as random-access memory (RAM), flash memory, or a combination thereof, configured to store data for access by the processor 104. The memory 105 may be representative of a plurality of memories 105 as can be appreciated. The data stored in the memory 105, for example, is associated with the operation of the various applications and/or functional entities described below.

In the example of FIG. 1, the memory 105 stores AR objects (e.g. AR objects 115 and 116), sometimes referred to as "stickers", for display via the display 110. Examples of AR objects can include figure images (e.g., images of characters from movies, television shows, musicians, and the like), emojis, cartoon characters, weather images, generated text, and the like. In some embodiments, the AR objects are modifiable by the processor 104. For example, one or more of the AR objects can include a modifiable text string that can be changed by the processor 104, one or more color features wherein the color can be changed by the processor 104, a position can be associated with one or more of the AR objects wherein the positioning can be changed by the processor 104, lighting may be associated with one or more of the AR objects wherein the lighting can be changed, and the like.

In operation, the processor 104 combines images captured by the camera 108 with one or more AR objects to generated combined images (e.g., combined image 118) and displays the combined image at the display 110. In some embodiments, the processor 104 generates a combined image by segmenting the captured image into foreground pixels and background pixels. To segment the image, the processor 104 can apply any image segmentation method, or a combination thereof, including pixel thresholding, data clustering, motion and interactive segmentation, compression-based segmentation, histogram based segmentation, edge detection, dual clustering, region-growing, partial differential equation segmentation (e.g., parametric, level set, or fast marching), variational segmentation, watershed transformation, model-based segmentation, multi-scale segmentation, semi-automatic segmentation, trainable segmentation, multispectral segmentation, and the like. For example, in at least one embodiment the processor 104 employs segmentation or other object identification techniques to identify one or more figures in a foreground of a captured image (e.g., image 108), such as the figure of the user in a self-picture ("selfie"). The processor 104 identifies pixels representing the identified figures as foreground pixels and identifies all other pixels of the captured image as background pixels. The processor 104 generates the combined image 118 by compositing the selected and modified AR object with the captured image 108.

In some embodiments, the processor 104 selects and modifies the AR object for display based on one or more contextual cues, or a combination thereof, wherein the contextual cues can be generated based on the images captured by the camera 102, by the pose information generated by the pose sensors 106, by information received via a network (e.g. weather information received via the internet), sensor information received from sensors of the electronic device 100 (e.g. sound information received via one or more microphones), and the like, or any combination thereof. To illustrate via an example, if the processor 104 receives whether information indicating rainy weather in the location of the electronic device 100, the processor 104 can select an AR object representing a cloud or rain. If the processor 104 receives information indicating a loud noise in the environment of the electronic device 100, the processor 104 can select an object indicating a BANG! Sound.

In some embodiments, the processor 104 can select the AR object based on detected emotion of one or more persons identified in imagery captured by the camera 102. To identify the emotion, the processor 104 can execute one or more facial and emotion recognition algorithms that identify points on a user's face, and identify emotion based on specified relationships between the identified points. For example, the relationship between the points can indicate that the person is smiling, frowning, or expressing another emotion. Examples of AR objects that can be selected or modified based on identified emotions include:

| | |
|---|---|
| No re-active signals | Sticker behaves with emergent behavior. |
| Person is detected | Sticker plays Greet animation. |
| No sentiment is detected, person is still in view | Sticker plays idle and emotes. Sticker occasionally turns and looks at the person's face in all states. |
| Person smiles widely and "Happy" is detected. | Sticker transitions from Idle to Happy animation state and maintains this loop until the Happy sentiment is no longer detected. |
| Person frowns and "Sad" is detected. | Sticker transitions from Happy loop to the Sad loop while animating through an idle pose. |
| Person looks "Surprised". | Sticker transitions from Sad loop to Surprised loop. Sticker looks at person's face occasionally to create eyeline connection |

Figure 2:
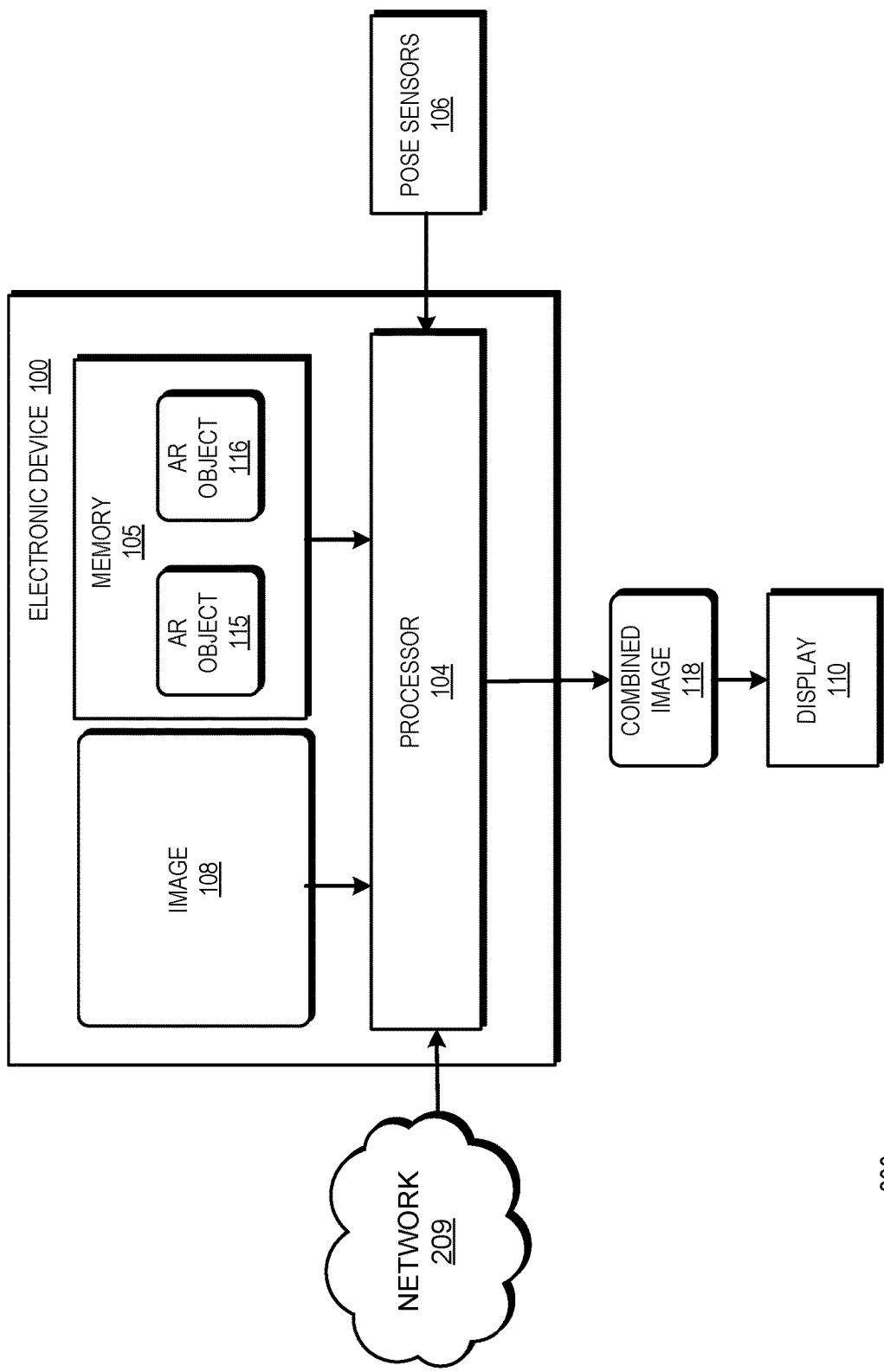
FIG. 2 is an example of a networked environment according to various embodiments.

With reference to FIG. 2, shown is a networked environment 200 according to various embodiments. The networked environment 200 includes the electronic device 100 with one or more client devices (not shown) and a network 209. The network 209 includes, for example, the Internet, intranets, extranets, wide area networks (WANs), local area networks (LANs), wired networks (LANs), wired networks, wireless networks, or other suitable networks, etc., or any combination of two or more such networks.

Various applications and/or other functionality may be executed in the electronic device 100 according to various embodiments. Also, various data is stored at in the memory 105 that is accessible to the electronic device 100. In some embodiments, the electronic device 100 is configured to capture an image 108 and employ a processor 104 to obtain one or contextual cues from the image 108. For example, the contextual cues obtained from the image 108 may include a person, a facial expression, a sound, a location, a time, a date, an activity, weather information, an item, or combinations thereof. To this end, the image 108 may include a person, a group of people, selfie images, the mood of the person depicted in the image. For example, the image 108 may depict a person smiling. In this example, the electronic device 100 may be configured to implement a processor 104 to obtain contextual cues indicating a happy mood associated with the person. In some embodiments, the AR objects are configured to dynamically react in response to changes in the facial expression associated with a user depicted in the camera view. For example, in response to the detection of a person depicted in the camera view, the AR objects may be configured to acknowledge the person such that the AR objects is configured to nod, wave, smile, and/or perform other gestures. Additionally, the AR objects may be configured to respond to changes in facial expressions or movements associated with the person's face such as for example, an eye blink, an eyebrow raise, eye movement up and down, eye movement side to side, a moth frown, a mouth smile, and/or other movements associated with the user's face. For example, in response to detecting a user's smile, the AR object may be configured to smile. In other embodiments, the contextual cues may be associated with objects or items such as, for example, food, art, water, a plant, an article of clothing, an animal, and/or any other curated object. In other embodiments, the contextual cues may be associated with activities such as, for example, vacationing, shopping, running, swimming, hiking, attending a sports event, attending a concert, and/or other activities. In yet other embodiments, the contextual cues may be associated a location such as, for example, a country, a state, a home, an office, a school, a restaurant, a specific landmark, and/or other locations. In another embodiment, the contextual cues may be associated with time such as, for example, a time of day, a day of the week, a month of the year, a holiday, and/or time. In some embodiments, the contextual cues may be associated with a sound such as, for example, an instrument, people, a song, music, and/or other sounds. In other embodiments, the contextual cues may be associated with weather information such as, for example, snow, rain, monsoon, thunder, lightning, tornado, hurricane, sunset, sunrise, and/or other weather information. In yet other embodiments, the contextual cues may be based on one or more images captured by a camera associated with the electronic device 100, information generated by one or more sensors associated with the electronic device, information received via a network 209 associated with the electronic device 100 or combinations thereof.

In some embodiments, in response to receiving the contextual cues associated with the image 108, the processor 104 identifies at least one augmented reality (AR) object 115, 116 from the memory 105 such that the AR object 115, 116 is identified based on the contextual cues received by the electronic device 100. In some embodiments, the AR object 115, 116 is identified based on a selection by a user.

Upon identifying the AR object 115, 116 the processor 104 is further configured to combine the image 108 with the identified AR object 115, 116 and display the combined image 118 at the display 110 as explained above. In some embodiments, the processor 104 may employ image segmentation techniques to generate the combined image 118.

Additionally, in some embodiments, the processor 104 may be utilized by the electronic device 100 to change and/or modify the identified AR object 115, 116 based on a change in the one or more contextual cues. In other embodiments, once the AR objects 115, 116 are identified by the processor 104, the processor 104 is also configured to rank the identified AR objects 115, 116 based on a confidence metric associated with the identified AR objects 115, 116 and presents a set of AR objects 115, 116 based on the ranking. In other embodiments, the electronic device 100 may be configured to receive the one or more contextual cues obtained from a sensor such as, for example, pose sensors 106 associated with the electronic device.

Figure 3:
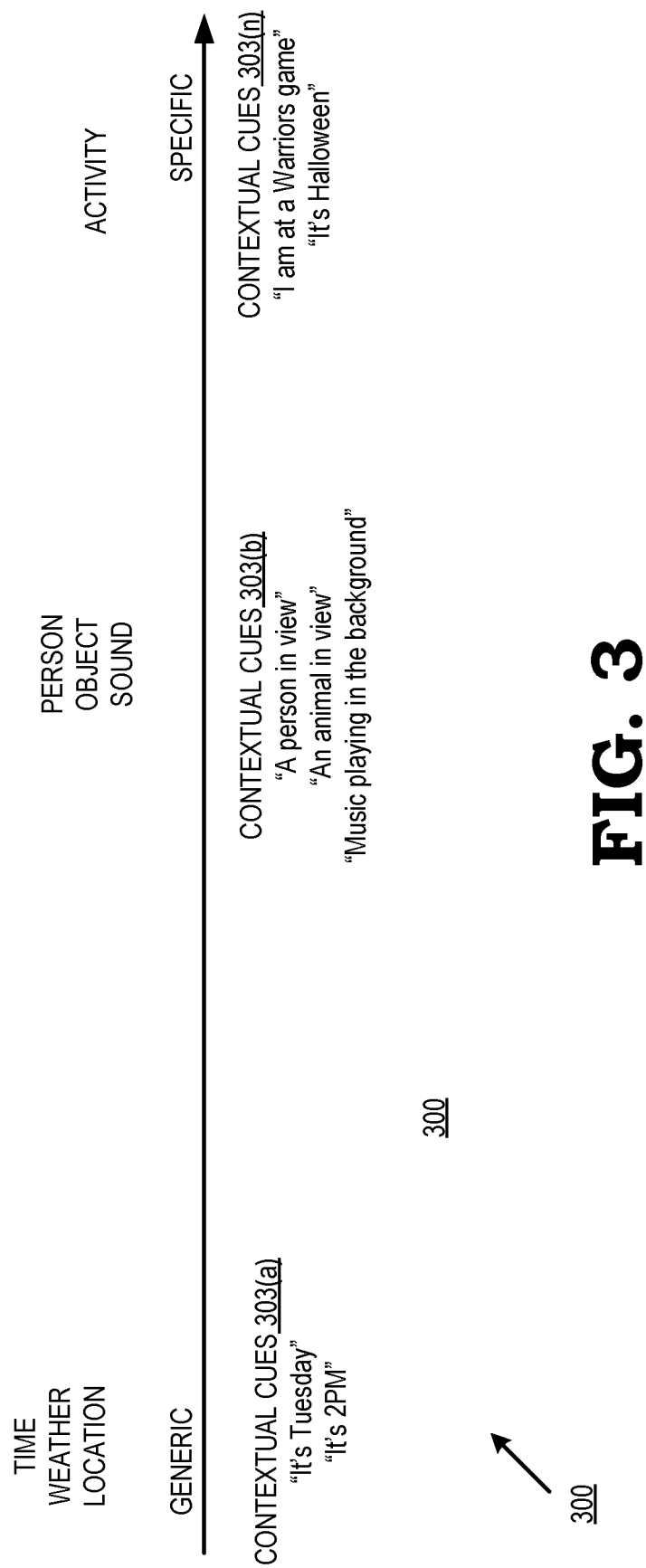
FIG. 3 illustrates an exemplary ranking context in accordance with some embodiments.

FIG. 3 illustrates an exemplary ranking context 300 in accordance with some embodiments. For example, in some embodiments, the contextual cues $303(a)$-$303(n)$ are ranked based on a confidence metric associated with the contextual cues $303(a)$-$303(n)$. In some embodiments, the confidence metric indicates a degree of correlation between the contextual cues and the identified AR objects. To this end, the contextual cues $303(a)$-$303(n)$ identified by the processor 104 (FIG. 1) are ranked a generic to specific spectrum based on their corresponding confidence metric. In some embodiments, the contextual cues $303(a)$ having a lower confidence metric may be identified as generic contextual cues. The contextual cues $303(n)$ may have a higher confidence metric may be identified as specific contextual cues. For example, in some embodiments, the contextual cues $303(a)$-$303(n)$ may include people, objects, activities, locations, dates, times, sound, weather, and/or contextual cues. For each of the contextual cues $303(a)$-$303(n)$, the processor 104 may be configured to compute a confidence metric. In some embodiments, the confidence metric may be computed by adding together relevant signals associated with each contextual cue and assign a score per contexts. As an example, the confidence metric may be based on the number of contextual cues associated with a particular context. Similarly, in these embodiments, the processor 104 is configured to rank the identified AR objects 115, 116 (FIG. 1) based on a confidence metric associated with the AR object 115, 116. Likewise, in these embodiments, the identified generic AR objects may be ranked lower than the identified specific AR objects. In these embodiments, the processor 104 may be configured to present the identified AR objects 115, 116 for rendering on the display 110 based on the ranking.

Figure 4:
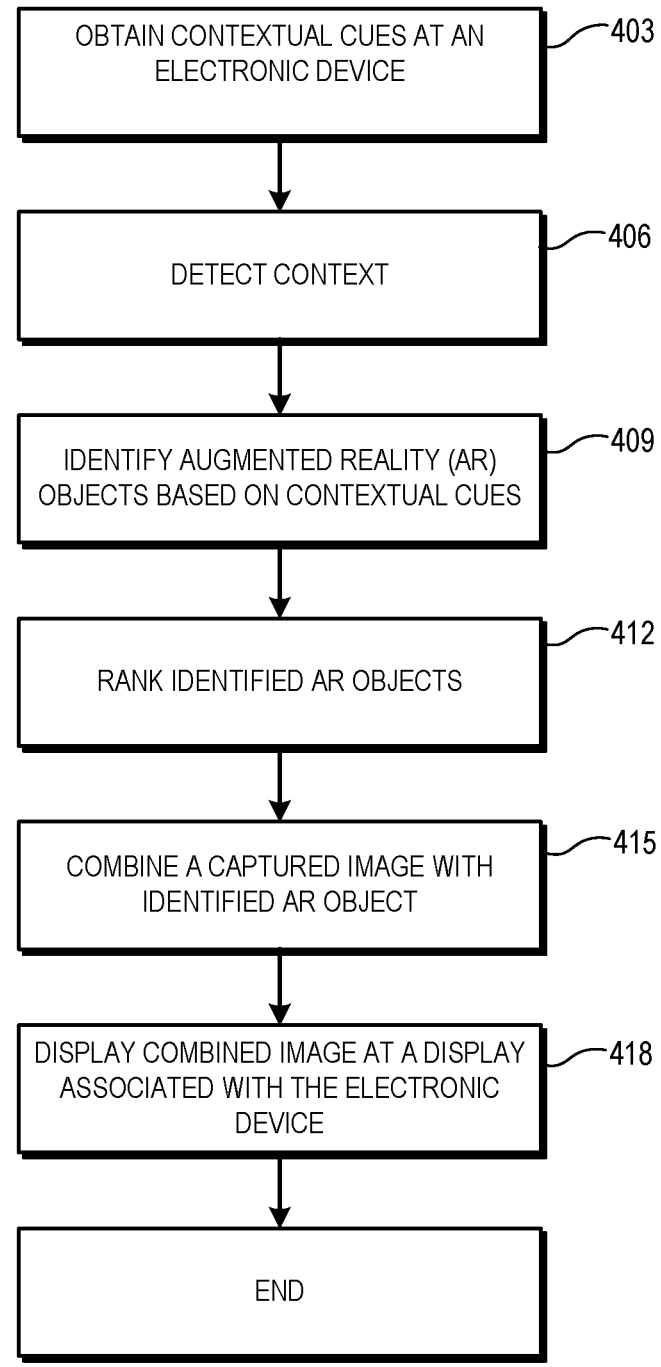
FIG. 4 is a flowchart illustrating one example of functionality implemented to select augmented reality objects based on contextual cues associated with an image captured by a camera associated with an electronic device according to various embodiments.

Referring next to FIG. 4, shown is a flowchart that provides one example of a method for selecting an augmented reality object for display in an image of a real environment based contextual cues in accordance with some embodiments. It is understood that the flowchart of FIG. 4 provides merely an example of the many different types of arrangements that are employed to select augmented reality objects for display based on contextual cues as described herein. As an alternative, the flowchart of FIG. 4 is viewed as depicting an example of steps of a method implemented in an electronic device according to various embodiments. It is understood that the flow can differ depending on specific circumstances. Also, it is understood that other flows are employed other than those discussed herein Beginning in block 403, electronic device 100 (FIG. 1) obtains contextual cues 303(a)-303(n) (FIG. 3) associated with an image 108 via utilization of a processor 104 (FIG. 1) configured to identify contextual cues 303(a)-303(n) from the image 108. For example, in some embodiments, the electronic device 100 includes a camera that captures images of the real environment. In block 406, the electronic device 100 employs the processor 104 to detect context based on contextual cues, such as an identified user expression, objects or figures identified from the captured images, received weather or other environmental information, time of day, sound information, and the like. Next, in block 409, in response to receiving the contextual cues associated with the image 108, the electronic device 100 is configured implement the processor 104 to identify and/or select at least one augmented reality (AR) object 115, 116 from the memory 105 such the AR object 115, 116 is identified based on the contextual cues received by the electronic device 100. In block 412, the processor 104 is configured to rank the identified AR objects 115, 116 (FIG. 1) based on a confidence metric associated with the AR object 115, 116. Likewise, in these embodiments, the identified generic AR objects may be ranked lower than the identified specific AR objects. In these embodiments, the processor 104 may be configured to present the identified AR objects 115, 116 for rendering on the display 110 based on the ranking. In block 415, the electronic device 100 utilizes the processor 104 to composite the identified and/or selected AR object 115, 116 with the captured image. to generate a combined image for display. In block 415, the electronic device 100 implements the processor 104 to render the combined image 118 for display at a display 100 associated with the electronic device 100.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

In the following some examples are described.

Example 1: A method comprising:
obtaining one or more contextual cues at an electronic device;
identifying at least one augmented reality (AR) object from a memory associated with the electronic device based on the one or more contextual cues;
combining an image with the identified at least one AR object; and
displaying the combined image at a display associated with the electronic device.

Example 2: The method of example 1, wherein the contextual cues comprise a person, a facial expression, a sound, a location, a time, a date, an activity, weather information, an item, or combinations thereof.

Example 3: The method of example 1 or 2, further comprising generating the combined image using image segmentation.

Example 4: The method of at least one of the preceding examples, further comprising changing the identified at least one AR object based on a change in the one or more contextual cues.

Example 5: The method of at least one of the preceding examples, further comprising:
ranking the identified at least one AR object based on a confidence metric associated with the identified at least one AR object;
and
presenting a set of AR objects based on the ranking.

Example 6: The method of at least one of the preceding examples, further comprising identifying the one or more contextual cues from the image.

Example 7: The method of at least one of the preceding examples, further comprising receiving the one or more contextual cues from a sensor associated with the electronic device.

Example 8: The method of at least one of the preceding examples, the identified at least one AR object being based on a user selection.

Example 9: A system comprising:
 a memory configured to store at least one augmented reality (AR) object;
 a processor configured to combine an image from the memory with an identified one of the at least one AR object, wherein the identified one of the at least one AR object is identified based on one or more contextual cues associated with the image; and
 a display configured to display the combined image.

Example 10: The system of example 9, wherein the processor is configured to change the at least one identified object in response to a change in the one or more contextual cues.

Example 11: The system of example 9 or 10, the processor being further configured to:
 rank the identified at least one AR object based on a confidence metric associated with the identified at least one AR object;
 and
 present a set of identified AR objects based on the ranking.

Example 12: The system of at least one of the examples 9 to 11, wherein the contextual cues comprise a person, a facial expression, a sound, a location, a time, a date, an activity, weather information, an item, or combinations thereof.

Example 13: The system of at least one of the examples 9 to 12, the processor being further configured to obtain the one or more contextual cues from a sensor.

Example 14: The system of at least one of the examples 9 to 13, the processor being further configured to employ image segmentation to combine the image with the identified at least one AR object.

Example 15: The system of at least one of the examples 9 to 14, the identified at least one AR object being based on a user selection.

Example 16: A non-transitory computer readable medium embodying a set of executable instructions, the set of executable instructions to manipulate a computer system to perform a portion of a process to fabricate at least part of a processor, the processor comprising;
 a combining component configured to combine an image from a memory associated with an electronic device with an identified at least one augmented reality (AR) object, the identified at least one AR object being identified based on one or more contextual cues received by the electronic device; and
 a display configured to display the combined image.

Example 17: The non-transitory computer readable medium of example 16, the one or more contextual cues being based on one or more images captured by a camera associated with the electronic devices, information generated by one or more sensors associated with the electronic device, information received via a network associated with the electronic device or combinations thereof.

Example 18: The non-transitory computer readable medium of example 16 or 17, the processor being further configured to employ image segmentation to generate the combined image.

Example 19: The non-transitory computer readable medium of at least one of the examples 16 to 18, the processor being further configured to modify the identified at least one AR object.

Example 20: The non-transitory computer readable medium of at least one of the examples 16 to 19, the identified at least one AR object being modified based on a change of the one or more contextual cues.

What is claimed is:

1. A method comprising:
 obtaining one or more contextual cues at an electronic device;
 identifying multiple augmented reality (AR) objects from a memory associated with the electronic device based on the one or more contextual cues;
 ranking the multiple AR objects based on a confidence metric associated with each of the one or more contextual cues, and selecting at least one AR object of the multiple AR objects based at least in part on the ranking;
 combining an image with the selected at least one AR object; and
 displaying the combined image at a display associated with the electronic device.

2. The method of claim 1, wherein the contextual cues comprise a person, a facial expression, a sound, a location, a time, a date, an activity, weather information, an item, or combinations thereof.

3. The method of claim 1, further comprising generating the combined image using image segmentation.

4. The method of claim 1, further comprising changing the identified at least one AR object based on a change in the one or more contextual cues.

5. The method of claim 1, further comprising:
 presenting a set of AR objects based on the ranking.

6. The method of claim 1, further comprising identifying the one or more contextual cues from the image.

7. The method of claim 1, further comprising receiving the one or more contextual cues from a sensor associated with the electronic device.

8. The method of claim 1, wherein the selecting of the at least one AR object is further based on a user selection.

9. A system comprising:
 a memory configured to store a plurality of augmented reality (AR) objects;
 a processor configured to:
  identify multiple augmented reality (AR) objects from the memory based on one or more contextual cues;
  rank the multiple AR objects based on a confidence metric associated with each of the one or more contextual cues;
  select at least one AR object of the multiple AR objects based at least in part on the ranking; and
  combine an image from the memory with the selected at least one AR object; and
 a display configured to display the combined image.

10. The system of claim 9, wherein the processor is configured to change the at least one selected AR object in response to a change in the one or more contextual cues.

11. The system of claim 9, the processor being further configured to:
 present a set of identified AR objects based on the ranking.

12. The system of claim 9, wherein the contextual cues comprise a person, a facial expression, a sound, a location, a time, a date, an activity, weather information, an item, or combinations thereof.

13. The system of claim 9, wherein the processor is further configured to obtain the one or more contextual cues from a sensor.

14. The system of claim 9, wherein the processor is further configured to employ image segmentation to combine the image with the selected at least one AR object.

15. The system of claim 9, wherein the selected at least one AR object is further based on a user selection.

16. A non-transitory computer readable medium embodying a set of executable instructions, the set of executable instructions to manipulate a computer system to perform a portion of a process to fabricate at least part of a processor, the processor comprising:
   a ranking component configured to identify multiple augmented reality (AR) objects from a memory associated with an electronic device based on a confidence metric associated with one or more contextual cues, and to rank the multiple AR objects based at least in part on the associated confidence metric;
   a combining component configured to combine an image with a selected at least one augmented reality (AR) object, the selected at least one AR object being selected based at least in part on a rank assigned to the at least one AR object; and
   a display configured to display the combined image.

17. The non-transitory computer readable medium of claim 16, wherein the one or more contextual cues are based at least in part on one or more images captured by a camera associated with the electronic device, information generated by one or more sensors associated with the electronic device, information received via a network associated with the electronic device, or a combination thereof.

18. The non-transitory computer readable medium of claim 16, wherein the processor is further configured to employ image segmentation to generate the combined image.

19. The non-transitory computer readable medium of claim 16, wherein the processor is further configured to modify the at least one AR object.

20. The non-transitory computer readable medium of claim 16, wherein the selected at least one AR object is modified based on a change of the one or more contextual cues.

* * * * *